(12) United States Patent
Moriyama et al.

(10) Patent No.: US 12,162,171 B2
(45) Date of Patent: Dec. 10, 2024

(54) ROBOT CONTROL SYSTEM, ROBOT CONTROL METHOD, AND PROGRAM

(71) Applicant: JOHNAN Corporation, Uji (JP)

(72) Inventors: Kozo Moriyama, Uji (JP); Shin Kameyama, Uji (JP); Truong Gia Vu, Uji (JP); Lucas Brooks, Uji (JP)

(73) Assignee: JOHNAN Corporation, Uji (JP)

(*) Notice: Subject to any disclaimer, the term of this patent is extended or adjusted under 35 U.S.C. 154(b) by 268 days.

(21) Appl. No.: 17/761,213

(22) PCT Filed: Sep. 29, 2020

(86) PCT No.: PCT/JP2020/036823
§ 371 (c)(1),
(2) Date: Mar. 17, 2022

(87) PCT Pub. No.: WO2021/065880
PCT Pub. Date: Apr. 8, 2021

(65) Prior Publication Data
US 2022/0371201 A1   Nov. 24, 2022

(30) Foreign Application Priority Data
Sep. 30, 2019 (JP) .................. 2019-179127

(51) Int. Cl.
*B25J 9/16* (2006.01)
*B65G 47/90* (2006.01)

(52) U.S. Cl.
CPC ........... *B25J 9/1697* (2013.01); *B25J 9/1653* (2013.01); *B25J 9/1664* (2013.01); *B65G 47/905* (2013.01)

(58) Field of Classification Search
CPC ...... B25J 9/1697; B25J 9/1653; B25J 9/1664; B25J 13/08; B65G 47/905; G01B 11/005;
(Continued)

(56) References Cited

U.S. PATENT DOCUMENTS 10,386,792 B2 *   8/2019   Blayvas ................. G01S 13/931
2010/0274390 A1 * 10/2010   Walser ................... B25J 9/1697
                                                    700/259
(Continued)

FOREIGN PATENT DOCUMENTS

CN   101909828 A  * 12/2010  ............ B25J 9/1697
CN   109454638 A  *  3/2019
(Continued)

OTHER PUBLICATIONS

CN-101909828-A translation (Year: 2010).*
CN-109454638-A translation (Year: 2019).*
DE-102007028680-A1 translation (Year: 2008).*

*Primary Examiner* — Kyle T Johnson
(74) *Attorney, Agent, or Firm* — METROLEX IP LAW GROUP, PLLC; Robert L. Scott, Esq.

(57) ABSTRACT

A robot control system according to one or more embodiments may include a robot that performs a task in relation to a workpiece, a coordinate measuring machine that measures a three-dimensional shape of the workpiece, a control device that controls the robot in accordance with a measurement result from the coordinate measuring machine, and an image capturing apparatus that captures an image of the workpiece. An image capture interval for the image capturing apparatus is shorter than a measurement interval for the coordinate measuring machine. In a period after the coordinate measuring machine conducts a measurement and until the robot performs the task, the control device is configured to compute a position of the workpiece by referring to an image capture result from the image capturing apparatus.

5 Claims, 2 Drawing Sheets

(58) Field of Classification Search
CPC ...... G05B 19/4183; G05B 2219/39543; G05B 2219/40554
See application file for complete search history.

(56) References Cited

U.S. PATENT DOCUMENTS

| | | | | |
|---|---|---|---|---|
| 2013/0103179 | A1* | 4/2013 | Miyoshi | B25J 9/1697 |
| | | | | 700/228 |
| 2018/0009105 | A1* | 1/2018 | Kutsukake | B25J 9/163 |
| 2018/0106885 | A1* | 4/2018 | Blayvas | G01S 13/723 |
| 2018/0111268 | A1* | 4/2018 | Atohira | B25J 9/1671 |
| 2018/0117766 | A1* | 5/2018 | Atohira | B25J 9/1671 |
| 2021/0094136 | A1* | 4/2021 | Ooba | B25J 9/0093 |
| 2021/0341899 | A1* | 11/2021 | Garvey | G05B 19/401 |
| 2022/0371201 | A1* | 11/2022 | Moriyama | G05B 19/4183 |
| 2023/0039357 | A1* | 2/2023 | Jo | B60P 3/007 |
| 2024/0140736 | A1* | 5/2024 | Sher | B25J 9/1612 |
| 2024/0144494 | A1* | 5/2024 | Goussies | G06T 7/50 |

FOREIGN PATENT DOCUMENTS

| | | | | |
|---|---|---|---|---|
| DE | 102007028680 | A1 * | 12/2008 | ......... B25J 17/0266 |
| JP | H03-161223 | A | 7/1991 | |
| JP | H10-315167 | A | 12/1998 | |
| JP | 2013-086230 | A | 5/2013 | |

* cited by examiner

ROBOT CONTROL SYSTEM, ROBOT CONTROL METHOD, AND PROGRAM

TECHNICAL FIELD

The present invention relates to a robot control system, a robot control method, and a program.

BACKGROUND ART

Conventional techniques have disclosed picking devices for picking up workpieces (for example, see PTL 1).

One of the known picking devices is equipped with a robot for picking up a workpiece, a coordinate measuring machine for measuring a three-dimensional shape of the workpiece, and a control device for controlling the robot in accordance with a measurement result from the coordinate measuring machine. In this picking device, the control device that can acquire the three-dimensional shape of the workpiece can cause the robot to operate in accordance with the three-dimensional shape of the workpiece so as to hold the workpiece properly.

CITATION LIST

Patent Literature

PTL 1: JP H10-315167 A

SUMMARY OF INVENTION

Technical Problem

Although the control device in the above-mentioned picking device can acquire the three-dimensional shape of the workpiece, the measurement interval for the coordinate measuring machine is so long that the workpiece may be displaced in a period after the coordinate measuring machine conducts a measurement and until the robot is caused to perform a picking task. If the workpiece is displaced before the robot performs the picking task, the robot is likely to fail in the picking task.

The present invention is made to solve the above problem, and aims to provide a robot control system, a robot control method, and a program that can monitor a workpiece in a period after the coordinate measuring machine conducts a measurement and until the robot performs a task.

Solution to Problem

A robot control system according to the present invention includes a robot that performs a task in relation to a workpiece, a coordinate measuring machine that measures a three-dimensional shape of the workpiece, a control device that controls the robot in accordance with a measurement result from the coordinate measuring machine, and an image capturing apparatus that captures an image of the workpiece. An image capture interval for the image capturing apparatus is shorter than a measurement interval for the coordinate measuring machine. In a period after the coordinate measuring machine conducts a measurement and until the robot performs the task, the control device is configured to compute a position of the workpiece by referring to an image capture result from the image capturing apparatus.

In this configuration, the image capture interval for the image capturing apparatus is shorter than the measurement interval for the coordinate measuring machine. In the period after the coordinate measuring machine conducts the measurement and until the robot performs the task, this configuration enables computation of the position of the workpiece by referring to an image capture result from the image capturing apparatus, and thus enables detection of possible displacement of the workpiece.

A robot control method according to the present invention includes: a step of capturing an image of a workpiece by an image capturing apparatus; a step of measuring a three-dimensional shape of the workpiece by a coordinate measuring machine; a step of controlling a robot by a control device in accordance with a measurement result from the coordinate measuring machine, and thereby causing the robot to perform a task in relation to the workpiece; and a step of computing a position of the workpiece by the control device by referring to an image capture result from the image capturing apparatus, the computing step being conducted in a period after the coordinate measuring machine conducts a measurement and until the robot performs the task, wherein an image capture interval for the image capturing apparatus is shorter than a measurement interval for the coordinate measuring machine.

A program according to the present invention causes a computer to implement: a procedure for receiving an input of an image capture result from an image capturing apparatus that captures an image of a workpiece; a procedure for receiving an input of a measurement result from a coordinate measuring machine that measures a three-dimensional shape of the workpiece; a procedure for controlling a robot in accordance with the measurement result from the coordinate measuring machine, and thereby causing the robot to perform a task in relation to the workpiece; and a procedure for computing a position of the workpiece by referring to the image capture result from the image capturing apparatus, the computing procedure being implemented in a period after the coordinate measuring machine conducts a measurement and until the robot performs the task, wherein an image capture interval for the image capturing apparatus is shorter than a measurement interval for the coordinate measuring machine.

Advantageous Effects of Invention

The robot control system, the robot control method, and the program according to the present invention can monitor a workpiece in a period after the coordinate measuring machine conducts a measurement and until the robot performs a task.

DESCRIPTION OF EMBODIMENTS

An embodiment of the present invention is described below.

Figure 1:
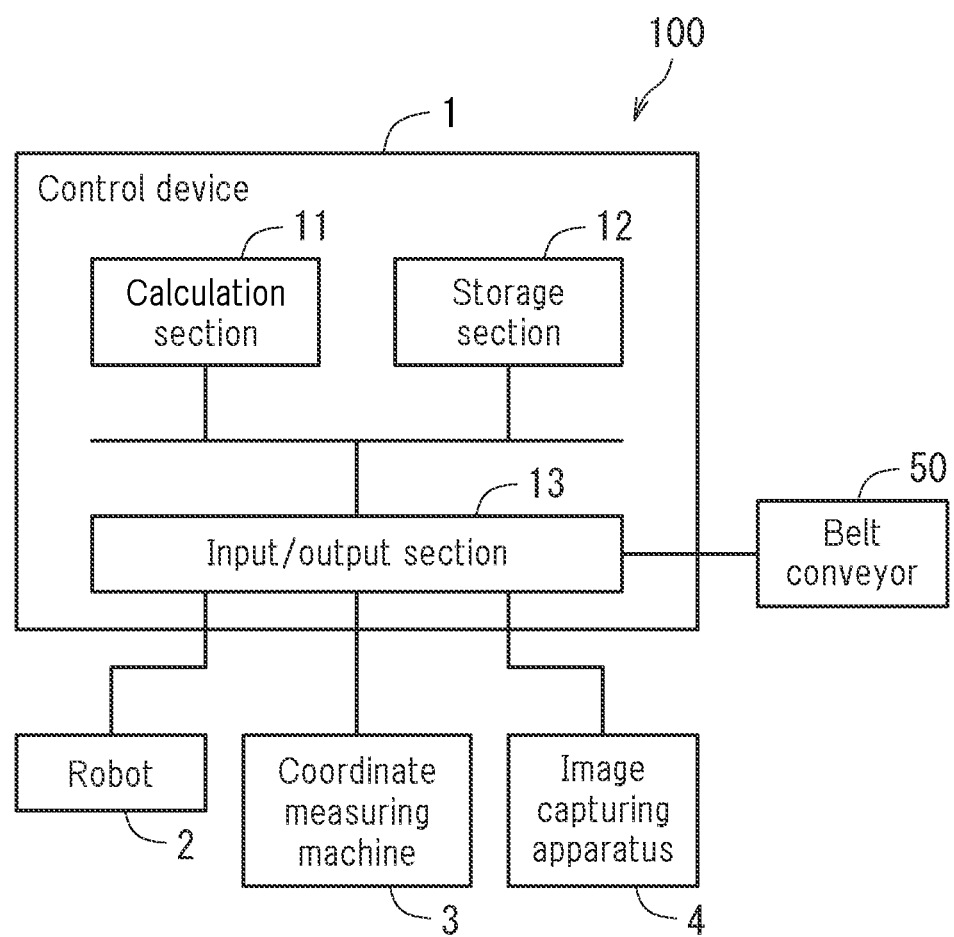
FIG. 1 is a block diagram showing a general configuration of a robot control system according to the present embodiment.

Referring to FIG. 1, a description is made of a configuration of a robot control system 100 according to an embodiment of the present invention.

The robot control system 100 is applied to a factory floor, for example, and is configured to cause a robot 2 to perform a task on the factory floor. As shown in FIG. 1, the robot control system 100 includes a control device 1, the robot 2, a coordinate measuring machine 3, and an image capturing apparatus 4. For example, the robot control system 100 includes a belt conveyor 50 for transporting a workpiece, and the task performed by the robot 2 is a picking task of gripping and lifting a workpiece from the belt conveyor 50.

The belt conveyor 50 is equipped with a belt, a belt drive, etc., and configured to transport one or more workpieces loaded on the belt. The belt conveyor 50 includes a feed part located upstream in a workpiece transport direction, a discharge part located downstream in the workpiece transport direction, and a transport part located between the feed part and the discharge part. On this belt conveyor 50, workpieces are sequentially loaded in the feed part and transported via the transport part to the discharge part.

The control device 1 is configured to control the robot control system 100 that includes the robot 2. The control device 1 includes a calculation section 11, a storage section 12, and an input/output section 13. The calculation section 11 is configured to control the control device 1 by performing arithmetic processing based on programs and the like stored in the storage section 12. The storage section 12 stores a program for controlling the robot 2 and other like programs. The input/output section 13 is connected to the robot 2, the coordinate measuring machine 3, the image capturing apparatus 4, and the belt conveyor 50, etc. Note that the control device 1 is an example of "the computer" in the present invention.

The robot 2 is controlled by the control device 1, for example, to perform the picking task. The robot 2 has a multi-axis arm and a hand. The hand, as an end effector, is provided at an extreme end of the multi-axis arm. The multi-axis arm serves to move the hand, and the hand serves to hold the workpiece. The robot 2 is configured to grip and lift a workpiece in the discharge part of the belt conveyor 50 and to remove the workpiece from the belt conveyor 50. In other words, the robot 2 serves to discharge a workpiece from the belt conveyor 50 that carries the workpiece.

The coordinate measuring machine 3 serves to measure a three-dimensional shape of the workpiece on the belt conveyor 50. For example, the coordinate measuring machine 3, with a measurement range thereof being set to cover the discharge part of the belt conveyor 50, is configured to measure the three-dimensional shape of the workpiece transported to the discharge part of the belt conveyor 50. The coordinate measuring machine 3 includes, for example, a light-emitting part for emitting a laser beam and a light-receiving part for receiving a laser beam reflected by a measurement target. The coordinate measuring machine 3 is configured to compute the distance to the measurement target and to generate a measurement result (3D point cloud data). The measurement interval for measuring a three-dimensional shape by the coordinate measuring machine 3 is set in advance at a first time interval (for example, about one second). The measurement result from the coordinate measuring machine 3 is sent out to the control device 1.

The image capturing apparatus 4 serves to capture an image of the workpiece on the belt conveyor 50. For example, the image capturing apparatus 4, with an image capture range thereof being set entirely across the belt conveyor 50, is configured to capture an image of a workpiece transported from the feed part to the discharge part of the belt conveyor 50. The image capture interval for the image capturing apparatus 4 is set in advance at a second time interval (for example, about 0.01 second to about 0.03 seconds) that is shorter than the first time interval. The image capture result from the image capturing apparatus 4 (the captured image) is sent out to the control device 1.

In this case, the control device 1 receives inputs of measurement results from the coordinate measuring machine 3 at first time intervals, and also receives inputs of image capture results from the image capturing apparatus 4 at second time intervals. The control device 1 is configured to control the robot 2 and the belt conveyor 50 in response to the inputs from the coordinate measuring machine 3 and the image capturing apparatus 4.

Specifically, the control device 1 is configured to acquire the shape, position, and orientation of the workpiece exactly, by referring to the measurement result from the coordinate measuring machine 3. The control device 1 is further configured to compute a picking position (a hand position of the robot 2), a picking posture (a hand orientation of the robot 2), and a picking timing (a timing for gripping a workpiece with the hand of the robot 2) for the robot 2 to pick up the workpiece, by referring to the shape, position, and orientation of the workpiece obtained by the measurement result from the coordinate measuring machine 3 and also referring to the transport speed of the workpiece by the belt conveyor 50.

The picking timing indicates the moment when the workpiece transported by the belt conveyor 50 passes a picked-up position (a position to be picked up) in the discharge part. The picked-up position is determined, for example, by the position of the workpiece, the transport speed of the workpiece by the belt conveyor 50, the preparation time for the picking task by the robot 2, and other like factors. The picking position and the picking posture are, for example, determined by the shape, orientation, and picked-up position of the workpiece.

In a period after the coordinate measuring machine 3 conducts a measurement and until the robot 2 performs the picking task, the control device 1 is configured to compute the position and orientation of the workpiece by referring to an image capture result from the image capturing apparatus 4. This configuration enables monitoring of displacement of the workpiece on the belt conveyor 50. On detecting displacement of the workpiece on the belt conveyor 50, the control device 1 is configured to suspend transportation of the workpiece by the belt conveyor 50 and to wait until a measurement result about the displaced workpiece is input from the coordinate measuring machine 3. In response to an input of a measurement result about the displaced workpiece, the control device 1 is configured to re-compute the picking position, etc. by using this measurement result and to resume the transportation of the workpiece by the belt conveyor 50.

—Operation of the Robot Control System—

Figure 2:
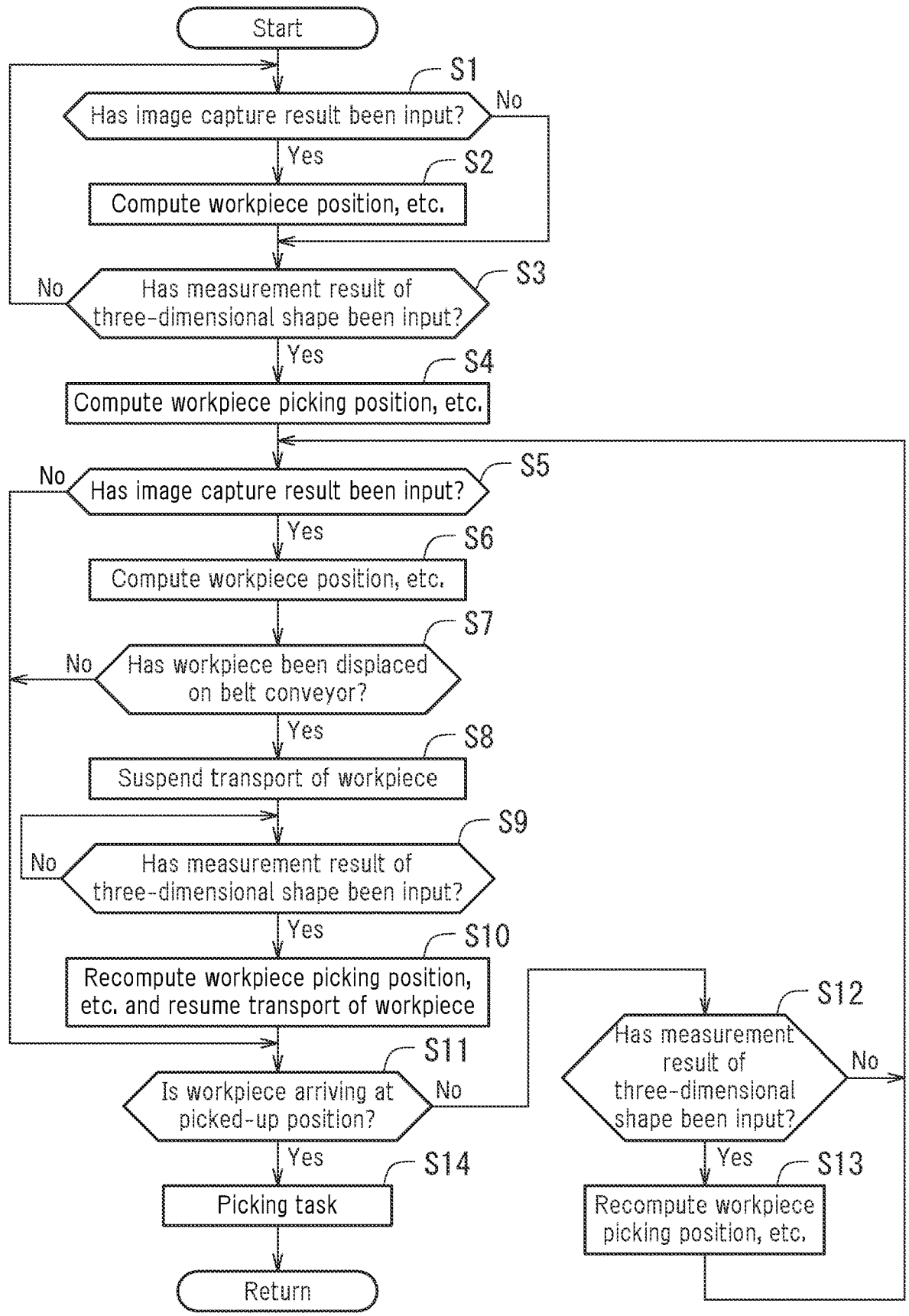
FIG. 2 is a flowchart describing an operation of the robot control system according to the present embodiment.

Referring next to FIG. 2, a description is made of an operation of the robot control system 100 (a robot control method) according to the present embodiment. For the purpose of simplicity, suppose that workpieces are fed one by one on the belt conveyor 50, with not more than one workpiece being present on the belt conveyor 50. In other words, no new workpiece is supposed to be fed in the feed part until a single preceding workpiece that was fed in the feed part of the belt conveyor 50 is discharged from the discharge part, and a new workpiece is supposed to be fed in the feed part only after the single preceding workpiece on the belt conveyor 50 is discharged from the discharge part. The following steps are performed by the control device 1.

During the operation, the coordinate measuring machine 3 conducts measurements at the discharge part of the belt conveyor 50 at first time intervals, and sends out results of the measurements to the control device 1. The image capturing apparatus 4 captures entire images of the belt conveyor 50 at second time intervals that are shorter than the first time intervals, and sends out results of the image capturing to the control device 1.

A workpiece is fed in the feed part of the belt conveyor 50 and then transported from the feed part to the discharge part by the belt conveyor 50. When the workpiece is loaded in the feed part of the belt conveyor 50, the image capture result sent out from the image capturing apparatus 4 contains the workpiece. When the workpiece is transported to the discharge part by the belt conveyor 50, the measurement result sent out from the coordinate measuring machine 3 contains the workpiece.

The transport speed of the workpiece by the belt conveyor 50 is controlled to a predetermined value by the control device 1. The predetermined value is defined in advance, for example, such that the coordinate measuring machine 3 can measure a three-dimensional shape of the workpiece at least once or more while the workpiece is present in the discharge part and such that the robot 2 can complete the picking task after the coordinate measuring machine 3 measures the three-dimensional shape.

In step S1 in FIG. 2, the control device 1 determines whether an image capture result containing a workpiece has been input from the image capturing apparatus 4. If an image capture result containing a workpiece has been input from the image capturing apparatus 4, the process goes to step S2. This is a case where the workpiece is present on the belt conveyor 50. On the other hand, if no image capture result containing a workpiece has been input from the image capturing apparatus 4 (in a case where no image capture result has been input or where an image capture result that does not contain a workpiece has been input), the process goes to step S3.

In step S2, the control device 1 computes the position and orientation of the workpiece by referring to the image capture result received in step S1, and then the process goes to step S3.

In step S3, the control device 1 determines whether a measurement result containing a workpiece has been input from the coordinate measuring machine 3. If a measurement result containing a workpiece has been input from the coordinate measuring machine 3, the process goes to step S4. This is a case where the workpiece has been transported to the discharge part by the belt conveyor 50. On the other hand, if no measurement result containing a workpiece has been input from the coordinate measuring machine 3 (in a case where no measurement result has been input or where a measurement result that does not contain a workpiece has been input), the process returns to step S1.

In step S4, the control device 1 computes the picking position, etc. for the robot 2 to pick up the workpiece. Specifically, the control device 1 acquires the shape, position, and orientation of the workpiece exactly, by referring to the measurement result received in step S3. The control device 1 then computes the picking position, the picking posture, and the picking timing for the robot 2 to pick up the workpiece, by referring to the shape, position, and orientation of the workpiece and the transport speed of the workpiece by the belt conveyor 50.

In step S5, the control device 1 determines whether an image capture result has been input from the image capturing apparatus 4. An image capture result that is input while a workpiece is present in the discharge part of the belt conveyor 50 is supposed to contain the workpiece. If an image capture result has been input from the image capturing apparatus 4, the process goes to step S6. On the other hand, if no image capture result has been input from the image capturing apparatus 4, the process goes to step S11.

In step S6, the control device 1 computes the position and orientation of the workpiece by referring to the image capture result received in step S5.

In step S7, the control device 1 determines whether the workpiece has been displaced on the belt conveyor 50, by referring to the position and orientation of the workpiece based on the image capture result from the image capturing apparatus 4. In other words, the control device 1 determines whether displacement of the workpiece is detected, except the travel of the workpiece transported by the belt conveyor 50. For example, no displacement of the workpiece is confirmed when the position and orientation of the workpiece based on the current image capture result match an estimated current position and orientation of the workpiece. The estimated current position and orientation of the workpiece are obtained from the position and orientation of the workpiece based on the previous measurement result or image capture result and from the transport speed of the workpiece by the belt conveyor 50. If displacement of the workpiece is confirmed on the belt conveyor 50, the process goes to step S8. On the other hand, if no displacement of the workpiece is confirmed on the belt conveyor 50, the process goes to step S11.

In step S8, the control device 1 suspends transportation of the workpiece by the belt conveyor 50; namely, the control device 1 temporarily stops the belt conveyor 50.

In step S9, the control device 1 determines whether a measurement result has been input from the coordinate measuring machine 3. A measurement result that is input while a workpiece is present in the discharge part of the belt conveyor 50 is supposed to contain the workpiece. If a measurement result has been input from the coordinate measuring machine 3, the process goes to step S10. On the other hand, if no measurement result has been input from the coordinate measuring machine 3, step S9 is repeated. In other words, the control device 1 waits until a measurement result is input from the coordinate measuring machine 3.

In step S10, the control device 1 re-computes the picking position, etc. and resumes transport of the workpiece. Specifically, the control device 1 acquires the shape, position, and orientation of the workpiece that has been displaced on the belt conveyor 50 exactly, by referring to the measurement result received in step S9. The control device 1 then computes the picking position, the picking posture, and the picking timing for the robot 2 to pick up the displaced workpiece, by referring to the shape, position, and orientation of the displaced workpiece and also referring to the timing and transport speed for resuming transportation of the workpiece by the belt conveyor 50.

In step S11, the control device 1 determines whether the workpiece is arriving at the picked-up position in the discharge part of the belt conveyor 50, or in other words, whether the picking timing based on the measurement result from the coordinate measuring machine 3 is coming. If the workpiece is arriving at the picked-up position, the process goes to step S14. On the other hand, if the workpiece is not arriving at the picked-up position, the process goes to step S12.

In step S14, the robot 2 performs the picking task in relation to the workpiece. Specifically, the robot 2 grips and lifts the workpiece when the workpiece transported by the belt conveyor 50 is passing the picked-up position. Thereafter, the process goes to Return.

In step S12, the control device 1 determines whether a measurement result has been input from the coordinate measuring machine 3. If a measurement result has been input from the coordinate measuring machine 3, the control device 1 re-computes the picking position, etc. in step S13 by referring to the received measurement result, and then the process returns to step S5. Specifically, if a measurement result containing the workpiece is input more than once, the control device 1 computes (updates) the picking position, etc. by referring to the latest measurement result (the measurement result received later). On the other hand, if no measurement result has been input from the coordinate measuring machine 3, the process returns to step S5.

Advantageous Effects

As described above, the present embodiment utilizes the image capturing apparatus 4 that has shorter image capture intervals than the measurement intervals for the coordinate measuring machine 3. In the period after the coordinate measuring machine 3 conducts the measurement and until the robot 2 performs the picking task, this configuration enables computation of the position of the workpiece by referring to an image capture result from the image capturing apparatus 4, and thus enables detection of possible displacement of the workpiece on the belt conveyor 50. Eventually, the present embodiment enables monitoring of the workpiece on the belt conveyor 50, in the period after the coordinate measuring machine 3 conducts the measurement and until the robot 2 performs the picking task. Although the coordinate measuring machine 3 can acquire the shape, etc. of the workpiece exactly, its large measurement interval is a drawback. The image capturing apparatus 4 can compensate for this drawback by monitoring the workpiece at its shorter image capture intervals.

On detection of displacement of the workpiece on the belt conveyor 50, the present embodiment suspends transportation of the workpiece by the belt conveyor 50 and waits until a measurement result is input from the coordinate measuring machine 3. This configuration enables exact acquisition of the shape, position, and orientation of the displaced workpiece, and can prevent failure in the picking task by the robot 2. In a case where the workpiece is displaced on the belt conveyor 50 in the period after the coordinate measuring machine 3 conducts the measurement and until the robot 2 performs the picking task, this configuration enables detection of the displacement and acquisition of a measurement result about the displaced workpiece from the coordinate measuring machine 3, and can prevent failure in the picking task by the robot 2.

Further, the present embodiment computes the position and orientation of the workpiece by referring to the image capture result from the image capturing apparatus 4, and can thereby enhance the accuracy in detecting displacement of the workpiece on the belt conveyor 50.

Other Embodiments

The embodiment disclosed herein is considered in all respects as illustrative and should not be any basis of restrictive interpretation. The scope of the present invention is therefore indicated by the appended claims rather than by the foregoing embodiment alone. The technical scope of the present invention is intended to embrace all variations and modifications falling within the equivalency range of the appended claims.

For example, the above embodiment mentions, but is not limited to, the example of causing the robot 2 to perform the picking task in relation to the workpiece. Alternatively, the robot may process the workpiece or handle the workpiece otherwise. In other words, the above embodiment mentions, but is not limited to, the example of the robot 2 equipped with the multi-axis arm and the hand. Alternatively, any robot structure is possible.

As the control parameters of the robot 2 adjusted in accordance with the measurement result from the coordinate measuring machine 3, the above embodiment mentions, but is not limited to, the example of setting the picking position, the picking posture, and the picking timing. Alternatively, the robot control parameters adjusted in accordance with the measurement result from the coordinate measuring machine may include a picking force (a gripping force for the robot's hand to grip the workpiece) or the like.

As an option to be taken on detection of displacement of the workpiece on the belt conveyor 50, the above embodiment mentions, but is not limited to, the example of suspending transportation of the workpiece by the belt conveyor 50. Alternatively, considering the size of the discharge part and/or the transport speed of the workpiece, the transport speed of the workpiece may be kept unchanged at the predetermined value or may be slowed down on detection of displacement of the workpiece on the belt conveyor.

The above embodiment mentions, but is not limited to, the example of causing the robot 2 to perform the picking task in relation to the workpiece that is being transported by the belt conveyor 50. Alternatively, the robot may be caused to perform the picking task in relation to a stationary workpiece that is not being transported by the belt conveyor. For example, the robot may be caused to perform the picking task in relation to a workpiece that is stored in a tray.

The above embodiment mentions, but is not limited to, the example of performing the picking task when the workpiece is passing the picked-up position. Alternatively, the belt conveyor may be stopped when the workpiece has reached the picked-up position, and meanwhile the picking task in relation to a stationary workpiece may be performed at the picked-up position.

The above embodiment mentions, but is not limited to, the example of allowing not more than one workpiece to be present on the belt conveyor 50. Alternatively, a plurality of workpieces may be present on the belt conveyor. In other words, one or more new workpieces may be fed in the feed part before a preceding workpiece transported by the belt conveyor is discharged from the discharge part.

The above embodiment mentions, but is not limited to, the example of setting the measurement range of the coordinate measuring machine 3 at the discharge part of the belt conveyor 50. Alternatively, the measurement range of the coordinate measuring machine may be set entirely across the belt conveyor.

The above embodiment mentions, but is not limited to, the example of setting the image capture range of the image capturing apparatus 4 entirely across the belt conveyor 50. Alternatively, the image capture range of the image capturing apparatus may be set at the discharge part of the belt conveyor.

The above embodiment mentions, but is not limited to, the example of computing the position and orientation of the workpiece by referring to the image capture result from the image capturing apparatus 4. Alternatively, the embodiment may be arranged to compute only the position of the workpiece by referring to the image capture result from the image capturing apparatus.

Additionally, the image capturing apparatus 4 in the above embodiment may be adapted to capture an image of a work area of the robot 2 so as to detect entry and exit of a person in the work area of the robot 2.

INDUSTRIAL APPLICABILITY

The present invention is applicable to a robot control system, a robot control method, and a program that controls a robot in accordance with the measurement result from the coordinate measuring machine.

| Reference Signs List | |
|---|---|
| 1 | control device (computer) |
| 2 | robot |
| 3 | coordinate measuring machine |
| 4 | image capturing apparatus |
| 50 | belt conveyor |
| 100 | robot control system |

The invention claimed is:

1. A robot control system comprising: a conveyor that conveys a workpiece thereon; a robot that performs a task in relation to the workpiece conveyed on the conveyor; a coordinate measuring machine that measures a three-dimensional shape of the workpiece by computing a distance to the workpiece on the conveyor; a control device comprising a computer that calculates a picking position for the robot to pick up the workpiece from the conveyer based on a measurement result from the coordinate measuring machine and controls the robot in accordance with the calculated picking position; and an image capturing apparatus that captures an image of the workpiece, wherein an image capture interval for the image capturing apparatus is shorter than a measurement interval for the coordinate measuring machine, and wherein, in a period after the coordinate measuring machine conducts a measurement and until the robot performs the task, the control device is configured to compute a position of the workpiece by referring to an image capture result from the image capturing apparatus and determine, based on the computed position of the workpiece on the conveyor, whether the workpiece on the conveyor is displaced with respect to the conveyor.

2. The robot control system according to claim 1, wherein the control device is configured, when it is determined that the workpiece on the conveyor is displaced with respect to the conveyor, to stop conveyance of the conveyor.

3. The robot control system according to claim 1, wherein the control device is configured, when it is determined that the workpiece on the conveyor is displaced with respect to the conveyor, to stop conveyance of the conveyor, receive a measurement result of the three-dimensional shape of the workpiece on the conveyor to recalculate the picking position, and resume the conveyance of the conveyor.

4. A robot control method comprising: capturing an image of a workpiece by an image capturing apparatus; measuring a three-dimensional shape of the workpiece by a coordinate measuring machine by computing a distance to the workpiece on a conveyor; controlling a robot by a control device in accordance with a measurement result from the coordinate measuring machine, and thereby causing the robot to perform a task in relation to the workpiece; and in a period after the coordinate measuring machine conducts a measurement and until the robot performs the task, computing a position of the workpiece by the control device by referring to an image capture result from the image capturing apparatus and determining, based on the computed position of the workpiece on the conveyor, whether the workpiece on the conveyor is displaced with respect to the conveyor, wherein an image capture interval for the image capturing apparatus is shorter than a measurement interval for the coordinate measuring machine.

5. A non-transitory computer-readable medium storing a program, which when read and executed causes a computer to perform operations comprising: receiving an input of an image capture result from an image capturing apparatus that captures an image of a workpiece; receiving an input of a measurement result from a coordinate measuring machine that measures a three-dimensional shape of the workpiece; controlling a robot in accordance with the measurement result from the coordinate measuring machine, and thereby causing the robot to perform a task in relation to the workpiece; and in a period after the coordinate measuring machine conducts a measurement and until the robot performs the task, computing a position of the workpiece by referring to the image capture result from the image capturing apparatus and determining, based on the computed position of the workpiece on a conveyor, whether the workpiece on the conveyor is displaced with respect to the conveyor, wherein an image capture interval for the image capturing apparatus is shorter than a measurement interval for the coordinate measuring machine.

* * * * *